(12) United States Patent
Repp

(10) Patent No.: US 10,392,044 B2
(45) Date of Patent: Aug. 27, 2019

(54) CLIMATE CONTROLLING MECHANISMS FOR CAR SEATS/STROLLERS

(71) Applicant: Jennifer Repp, Colleyville, TX (US)

(72) Inventor: Jennifer Repp, Colleyville, TX (US)

( * ) Notice: Subject to any disclaimer, the term of this patent is extended or adjusted under 35 U.S.C. 154(b) by 0 days.

(21) Appl. No.: 14/856,258

(22) Filed: Sep. 16, 2015

(65) Prior Publication Data

US 2016/0076830 A1    Mar. 17, 2016

Related U.S. Application Data

(60) Provisional application No. 62/050,857, filed on Sep. 16, 2014.

(51) Int. Cl.
| | |
|---|---|
| F28F 27/00 | (2006.01) |
| B62B 9/00 | (2006.01) |
| B60N 2/56 | (2006.01) |
| B62B 9/10 | (2006.01) |

(52) U.S. Cl.
CPC ............ *B62B 9/00* (2013.01); *B60N 2/56* (2013.01); *B60N 2/5614* (2013.01); *B60N 2/5635* (2013.01); *B60N 2/5678* (2013.01); *B62B 9/102* (2013.01); *B62B 2204/02* (2013.01); *B62B 2204/04* (2013.01)

(58) Field of Classification Search
CPC ....... B62B 9/00; B62B 9/102; B62B 2204/02; B62B 2204/04; B60N 2/56; B60N 2/5614; B60N 2/5635; B60N 2/5678; F28F 27/00
See application file for complete search history.

(56) References Cited

U.S. PATENT DOCUMENTS

| | | | | |
|---|---|---|---|---|
| 4,114,620 A | * | 9/1978 | Moore | A61F 7/02 5/421 |
| 4,175,297 A | * | 11/1979 | Robbins | A61G 7/05776 297/180.11 |
| 4,662,433 A | * | 5/1987 | Cahn | A41D 13/005 165/46 |
| 5,320,164 A | * | 6/1994 | Szczesuil | A41D 13/005 165/46 |
| 5,330,519 A | * | 7/1994 | Mason | A61F 5/05816 607/104 |
| 5,383,919 A | * | 1/1995 | Kelly | A61F 7/02 601/15 |
| 5,386,701 A | * | 2/1995 | Cao | A41D 13/0056 165/104.17 |
| 5,417,720 A | * | 5/1995 | Mason | A61F 5/05816 607/104 |

(Continued)

FOREIGN PATENT DOCUMENTS

GB    2278432 A  * 11/1994  .......... B60N 2/5614

*Primary Examiner* — Phi D A
(74) *Attorney, Agent, or Firm* — Kirby Drake

(57) ABSTRACT

A climate controlling mechanism may be provided for car seats/strollers that may be temperature regulated and may include a fail safe such that the climate controlling mechanism may shut down if not within the desired temperature range. The climate controlling mechanism may be built into a car seat/stroller and/or incorporated into a blanket or covering to be placed over a child. The climate controlling mechanism also may be portable. Further, the climate controlling mechanism may be self-charging or the climate controlling mechanism may be plugged into a car charger or other outlet in order to cool and/or heat.

20 Claims, 5 Drawing Sheets

(56) References Cited

U.S. PATENT DOCUMENTS

| | | | | |
|---|---|---|---|---|
| 5,623,828 | A * | 4/1997 | Harrington | B60H 1/00264 62/3.2 |
| 5,713,631 | A * | 2/1998 | O'Neill | A47C 4/54 297/284.6 |
| 5,755,275 | A * | 5/1998 | Rose | A61F 7/02 165/171 |
| 6,230,501 | B1 * | 5/2001 | Bailey, Sr. | A43B 1/0054 62/51.1 |
| 7,178,357 | B2 * | 2/2007 | Link | B60H 1/00264 62/440 |
| 7,976,572 | B2 * | 7/2011 | Ziaimehr | A61F 7/0085 607/104 |
| 9,452,769 | B1 * | 9/2016 | Williams | B62B 9/102 |
| 2003/0230109 | A1 * | 12/2003 | Link | B60H 1/00264 62/420 |
| 2005/0156725 | A1 * | 7/2005 | Muhammad | B60H 1/00978 340/457 |
| 2005/0246826 | A1 * | 11/2005 | McCarter | A41D 13/0053 2/458 |
| 2007/0234742 | A1 * | 10/2007 | Aoki | B60H 1/00285 62/3.3 |
| 2008/0136231 | A1 * | 6/2008 | Doherty | B60N 2/2881 297/219.12 |
| 2015/0091339 | A1 * | 4/2015 | Bomhard | B60N 2/5614 297/180.11 |
| 2015/0374045 | A1 * | 12/2015 | Codner | A41D 13/0025 2/455 |
| 2016/0058134 | A1 * | 3/2016 | Blunt | A44C 5/0023 454/329 |

* cited by examiner

CLIMATE CONTROLLING MECHANISMS FOR CAR SEATS/STROLLERS

CROSS-REFERENCE TO RELATED APPLICATION

This application claims the benefit of U.S. Provisional Patent Application No. 62/050,857, filed Sep. 16, 2014, the content of which is incorporated herein by reference in its entirety.

FIELD OF THE DISCLOSURE

The present disclosure generally relates to climate controlling mechanisms, and more particularly to climate controlling mechanisms for car seats/strollers.

BACKGROUND

Currently, a water cooling pad may be refrigerated or frozen and it may be placed in a car seat to cool it off after the car has been baking in the sun. However, these pads can cause the child's skin to experience freezer burn skin upon contact with the pad because the temperature of the pad cannot be regulated.

SUMMARY

Embodiments of the present disclosure may provide a climate controlling mechanism for car seats/strollers that may be temperature regulated and may include a fail safe such that the climate controlling mechanism may shut down if not within the desired temperature range. In some embodiments of the present disclosure, the climate controlling mechanism may be built into a car seat/stroller. It also should be appreciated that there may be embodiments wherein the climate controlling mechanism may be portable. In other embodiments of the present disclosure, more than one climate controlling mechanism may be employed, for example, one to be placed in the seat portion of the car seat/stroller and another to be incorporated into a blanket or covering that may be placed over the child. Further, there may be embodiments wherein the climate controlling mechanism is self-charging and there may be other embodiments wherein the climate controlling mechanism may be plugged into a car charger or other outlet in order to cool or heat as needed.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide a climate controlling mechanism for car seats/strollers that may be temperature regulated and may be used for cooling and/or heating purposes. In an embodiment of the present disclosure, if the climate controlling mechanism is being used for cooling purposes, it may be temperature regulated in the range of approximately 62-72 degrees Fahrenheit, or it may be temperature regulated to a specific temperature of approximately 68 degrees Fahrenheit. Higher temperature ranges or specific temperatures may be included if the climate controlling mechanism is to be employed for heating purposes. While certain temperatures have been identified, it should be appreciated that the temperature ranges also may differ depending on whether the climate controlling mechanism is being driven by air or water.

It may further be appreciated that there may be some embodiments of the present disclosure wherein a climate controlling mechanism may be used solely for cooling purposes, other embodiments of the present disclosure wherein a climate controlling mechanism may be used solely for heating purposes, and further embodiments of the present disclosure wherein a climate controlling mechanism may be used selectively for cooling and heating purposes. For example, in a climate where heating is rarely needed because the daily temperatures are fairly warm, there may be no need for a climate controlling mechanism that heats. However, a parent may desire a climate controlling mechanism that provides for a range of cooling levels. Similarly, in a cooler climate, a parent may not need a climate controlling mechanism that cools but may desire one that provides for a range of heating levels. In other more temperate climates, cooling and heating may be needed depending on the time of the year, and accordingly, a climate controlling mechanism may be employed that may be selectively used for both circumstances in embodiments of the present disclosure.

Figure 3:
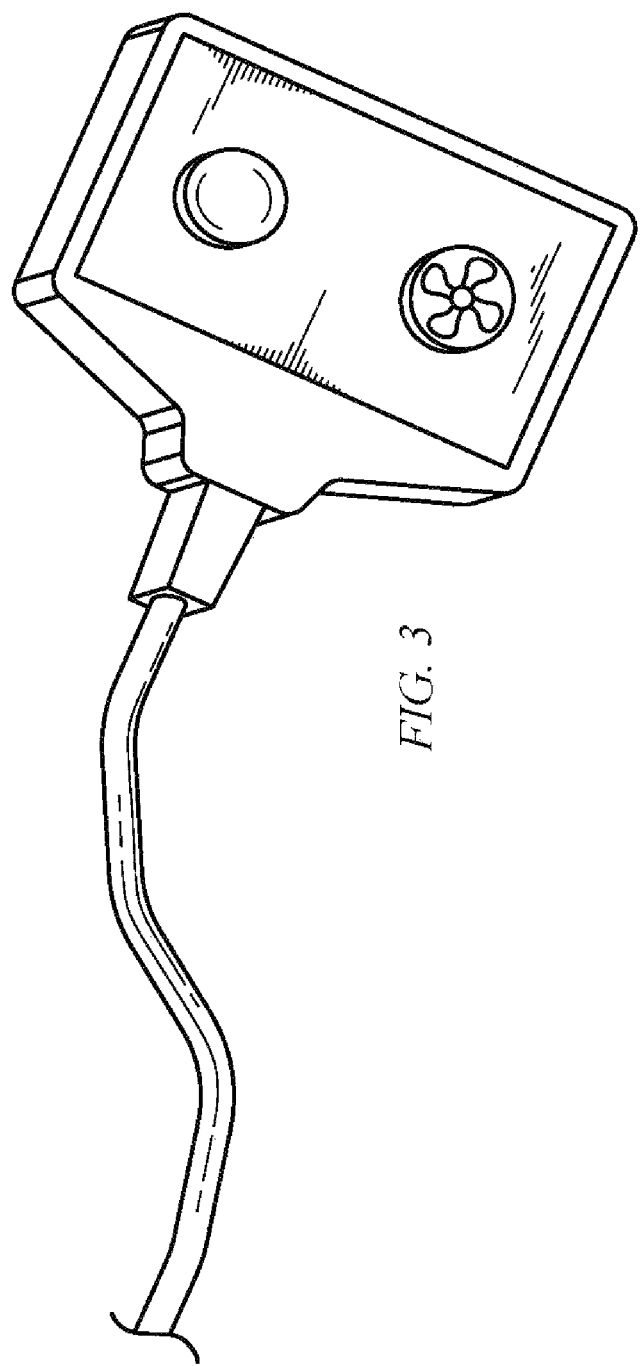
FIG. 3 depicts an input mechanism for controlling a climate controlling mechanism according to an embodiment of the present disclosure.

It also should be appreciated that there may be other embodiments of the present disclosure wherein the climate controlling mechanism may provide different buttons or selection mechanisms wherein a user may elect a particular temperature range depending on whether cooling or heating is desired. It should be appreciated that there may be embodiments of the present disclosure wherein the climate controlling mechanism includes an auto-set mechanism, including but not limited to, a dial, a touch screen, and a keypad, such that a user may program the climate controlling mechanism to be used at a particular temperature or within an approximate temperature range. In some embodiments of the present disclosure, the climate controlling mechanism may include one or more input mechanisms that correspond to fan speed levels, such as that depicted, for example, in FIG. 3. For example, there may be input mechanisms including blue markings to coordinate with fan speed levels for cooling and red markings to coordinate with fan speed levels for heating. While different colored markings have been described, it should be appreciated that other markings, such as words (i.e., warm, warmer, warmest) or actual temperatures (i.e., 62 degrees Fahrenheit, 67 degrees Fahrenheit, and 72 degrees Fahrenheit) may be employed without departing from the present disclosure. In a further embodiment of the present disclosure, the input mechanisms may include markings that indicate the strength of the fan being employed (i.e., one marking for low, two markings for medium and three markings for high), and these fan level markings may be employed on their own or in conjunction with another type of marking (i.e., color or temperature) without departing from the present disclosure. It also should be appreciated that there may be some embodiments where only 1-2 input mechanisms are provided, but there may be embodiments of the present disclosure where a plurality of input mechanisms are provided.

Figure 2:
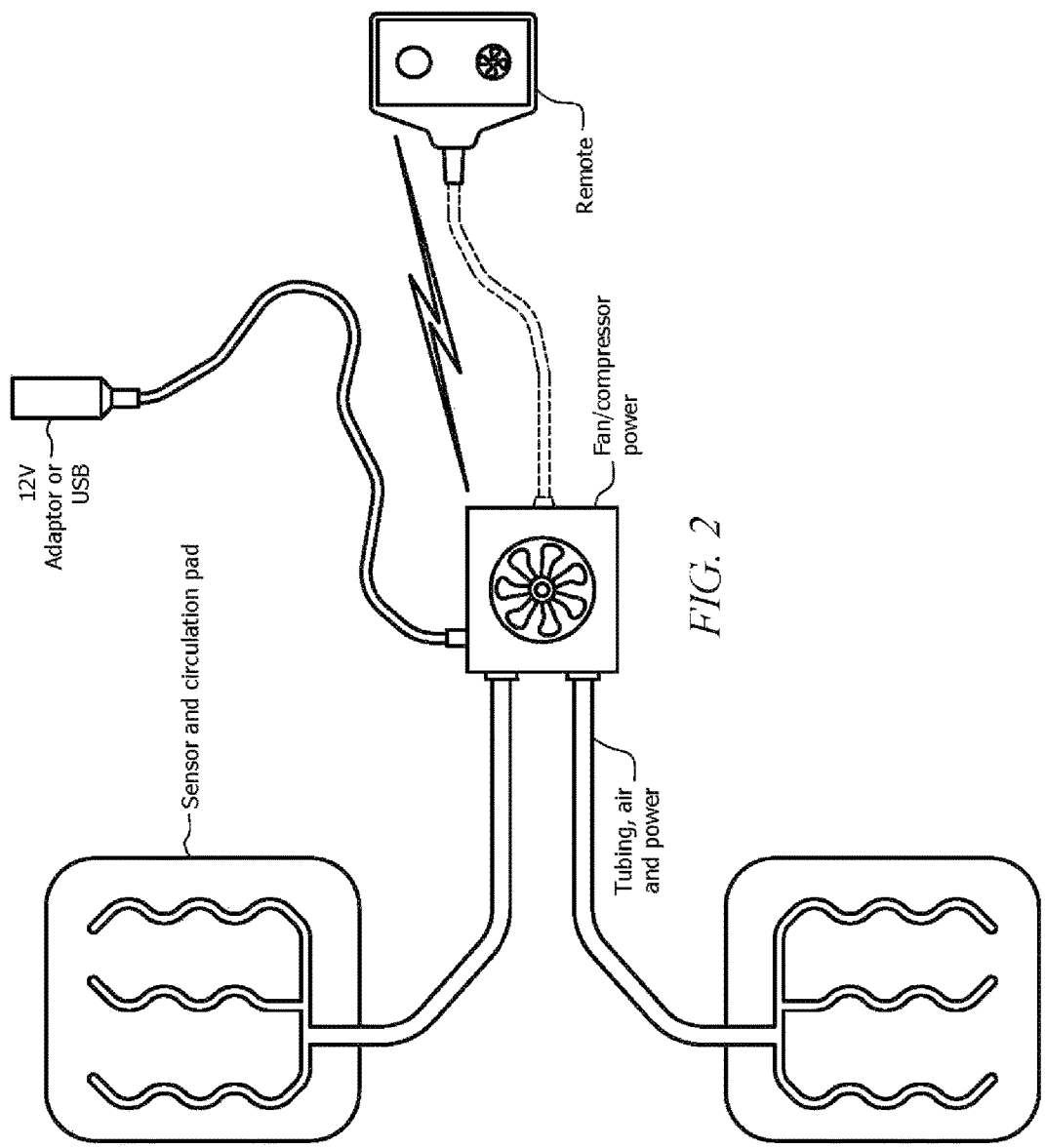
FIG. 2 depicts a climate controlling mechanism for a car seat/stroller according to another embodiment of the present disclosure.
Figure 5:
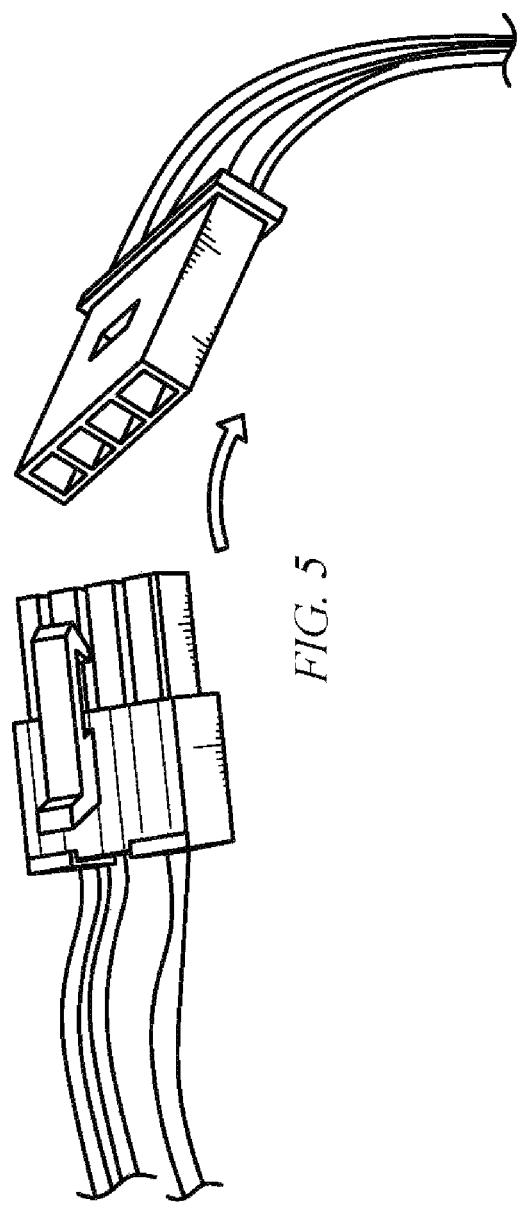
FIG. 5 depicts a sensor in a climate controlling mechanism according to an embodiment of the present disclosure.

It also should be appreciated that the climate controlling mechanism according to embodiments of the present disclosure may include a fail safe such that the climate controlling mechanism may shut down if falls outside a desired temperature range. Accordingly, if the auto-set mechanism is faulty and the temperature is too high or too low, then the climate controlling mechanism may automatically cease operating so as to not cause harm to a child that may come into contact with the climate controlling mechanism. In an embodiment of the present disclosure as depicted in FIG. 2, a climate controlling mechanism may include a sensor that may be permanently or removable incorporated into the climate controlling mechanism. FIG. 5 depicts an embodiment of a sensor that includes a plug-in feature so that the sensor may be removably attached to a power supply and/or water or air supply. In an embodiment of the present disclosure, the sensor may be encased in a fabric, including but not limited to, felt, and may include a circulation pad. The sensor may be utilized in a manner so that if the climate controlling mechanism were to overheat, the climate controlling mechanism may automatically turn off and not endanger the child.

In some embodiments of the present disclosure, the climate controlling mechanism may be built into a car seat/stroller. In an embodiment of the present disclosure, an existing car seat/stroller, such as may be used for infants or toddlers, may be retrofitted with a climate controlling mechanism. In another embodiment of the present disclosure, a newly manufactured car seat/stroller may be manufactured with the climate controlling mechanism. In such an embodiment, controls for the climate controlling may be integrated into the car seat/stroller. It should be appreciated that there may be embodiments of the present disclosure wherein controls for a climate controlling mechanism may be operated through a remote control such that a parent sitting in the front seat of the car may monitor the temperature of the climate controlling mechanism inserted in/attached to a car seat/stroller in the back seat of the car. It also should be appreciated that there may be embodiments wherein the climate controlling mechanism may be portable such that it may be removed from one car seat/stroller and inserted in/attached to another car seat/stroller. This may be helpful, for example, when a child grows out of one car seat/stroller and needs a new one; accordingly, only one cooling mechanism may be needed to accommodate a child's growth cycle.

In other embodiments of the present disclosure, different sizes of climate controlling mechanisms may be provided that may be used with different ages of children, including but not limited to, a climate controlling mechanism that may be sized for infants and a cooling mechanism that may be sized for toddlers. It should be appreciated that a climate controlling mechanism that may be sized for infants may have dimensions in the range of approximately 4 inches by 6 inches and a climate controlling mechanism that may be sized for toddlers may have dimensions in the range of approximately 8 inches by 12 inches; however, the dimensions may be larger or smaller without departing from the present disclosure. Regardless the specific dimensions, the climate controlling mechanism according to embodiments of the present disclosure should have dimensions such that the climate controlling mechanism may be placed underneath the child (i.e., in the seat portion of the car seat/stroller) and provide even cooling and/or heating of the child.

In further embodiments of the present disclosure, the climate controlling mechanism may be incorporated into a blanket that may be used on its own or in conjunction with a climate controlling mechanism that may be placed into the seat portion of a car seat/stroller. A cooling mechanism incorporated into a blanket may have dimensions in the range of approximately 24 inches square; however, the dimensions may be larger or smaller without departing from the present disclosure.

Further, there may be embodiments wherein the climate controlling mechanism may be self-charging (i.e., may be battery-operated) or may hold a charge for a specified period of time. There may be other embodiments wherein the climate controlling mechanism may include an electrical component such that it may be plugged into a car charger or another outlet in order to operate. For example, a climate controlling mechanism that may be utilized in a stroller may include a built-in charger or a charging mechanism such that it may be plugged in when the climate controlling mechanism is not in use.

Figure 1:
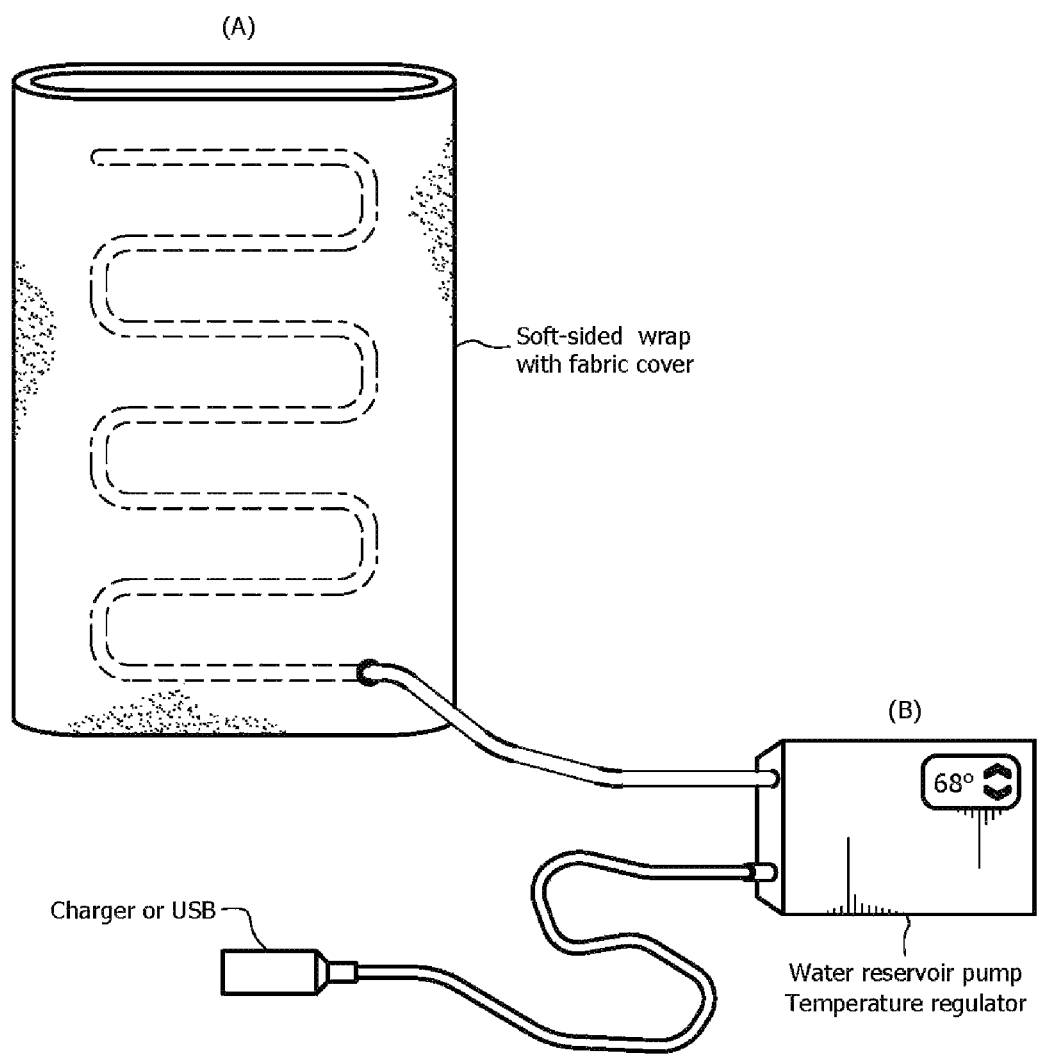
FIG. 1 depicts a climate controlling mechanism for a car seat/stroller according to an embodiment of the present disclosure.

When a climate controlling mechanism is utilized for cooling purposes, a climate controlling mechanism according to an embodiment of the present disclosure may be constructed using a plastic hard-sided cooler. In an embodiment of the present disclosure, the cooler may be the size of a 12-can cooler (see, e.g., FIG. 1—Item B). However, it should be appreciated that the cooler used may be smaller or larger without departing from the present disclosure. For example, if a climate controlling mechanism is to be used in a double stroller, a larger cooler may be utilized so that a single climate controlling mechanism may be used for the entire stroller; however, it should be appreciated that in the double stroller example, two climate controlling mechanisms may be incorporated without departing from the present disclosure, and a single cooler may be utilized to cool both climate controlling mechanisms or more than one cooler may be utilized without departing from the present disclosure. While a basic cooler has been utilized here to construct a climate controlling mechanism, it should be appreciated that a cooler-type device may be specially constructed as part of the cooling mechanism without departing from the present disclosure.

It also should be appreciated that there may be embodiments wherein one climate controlling mechanism is utilized in the seat or back portion of the car seat/stroller and a second climate controlling mechanism may be incorporated into a blanket that may be placed over a child in a car seat/stroller. Similar to the double stroller example, a single cooler may be used to cool both the climate controlling mechanism in the seat/back portion as well as the climate controlling mechanism in the blanket or more than one cooler may be utilized without departing from the present disclosure.

A climate controlling mechanism utilizing water for heating/cooling may be constructed using a 12 VDC submersible bilge pump and refillable water reservoir according to an embodiment of the present disclosure (see, e.g., FIG.

1—Item B). It should be appreciated that the bilge pump is described as being 12 VDC as this is what would be needed to generally run within a car. However, it should be appreciated that other 12 VDC pumps, such as a 12 VDC fountain pump or "solar" pump may be utilized without departing from the present disclosure. In an alternative embodiment of the present disclosure, a power inverter may be utilized to run a standard 120 VAC fountain pump or other type of pump from a car cigarette lighter socket. However, it should be appreciated that unless a higher end pump is purchased, this may be noisy and may produce more heat than may be desired.

In other embodiments of the present disclosure, a climate controlling mechanism may utilize a fan instead of water to assist in heating/cooling. In such embodiments, a fan and compressor (see FIG. 2) may be incorporated into a portable plastic-sided device, such as the cooler previously described, and air may be transferred from the fan/compressor into the climate controlling mechanism placed in the seat/back portion of car seat/stroller and/or in a blanket via tubing. The tubing may be plastic circular tubing that may extend the distance between the plastic device housing the fan/compressor up to the mat in the seat/back portion and/or in the blanket. The air may then disperse evenly through the mat and then through a fabric lining that may be formed around the mat. It should be appreciated that there may be embodiments of the present disclosure wherein the mat also may include an additional swaddle cloth-like lining that may enclose the mat but still be removable so that it may be washed/cleaned and then replaced. In some embodiments of the present disclosure, the mat itself may include one or more layers of material dispersed in a manner that will allow for proper circulation and ventilation of air that travels into the mat from the compressor.

Other components of a climate controlling mechanism according to embodiments of the present disclosure may include 12 VDC wire (approximately 5 feet), 4-5 refreezable freezer packs (if being used for cooling purposes), ID vinyl tubing of various sizes (approximately 3 inches of ¾" ID vinyl tubing, approximately 20-24 inches of ⅜" vinyl tubing, approximately 14 inches of ¼" ID vinyl tubing), and approximately 30-35 inches of ¼" OD tubing (as may be used for drip irrigation). If a fan/compressor is utilized in connection with the climate controlling mechanism, there may be electrical wiring with a connector that extends from the fan and connects to wires that may extend from the mat. The wiring extending from the mat may include a plastic-type portion that may connect or disconnect from wiring associated with the compressor. There also may be tubing that runs from the compressor to allow air to move from the fan up to the mat being used in the seat/back portion and/or blanket associated with the climate controlling mechanism. Additionally, the climate controlling mechanism may be constructed using at least one ¾"×⅜" ID reducer coupling, approximately two Y adapters for use with the ¼" tubing, approximately four ¼"×5/32" reducing couplings, approximately two small screw-type hose clamps (or alternatively, ⅜"×¼" inch reducer couplings), and approximately two ⅜" quick release couplings.

Figure 4:
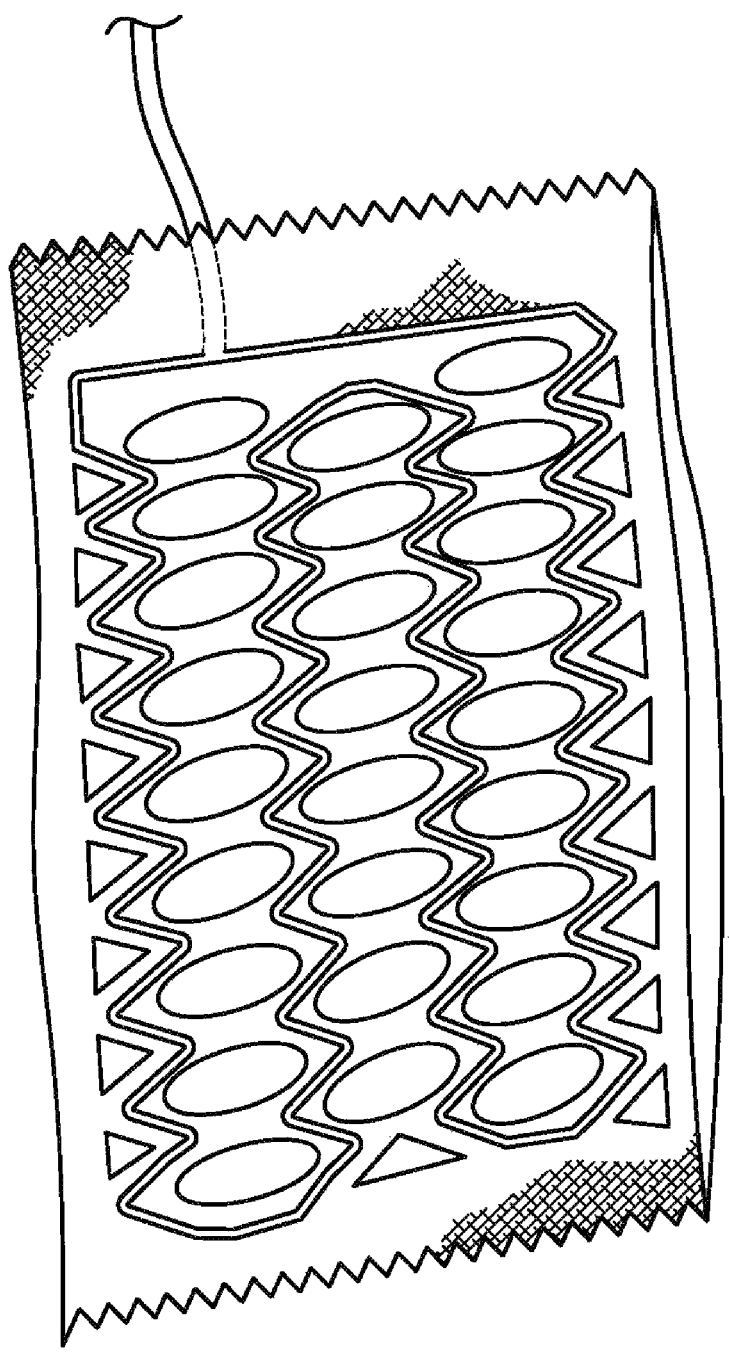
FIG. 4 depicts a fabric-covered mat for a climate controlling mechanism according to an embodiment of the present disclosure.

Various materials may be used to encase the cooling/heating components of the climate controlling mechanism according to embodiments of the present disclosure. In an embodiment of the present disclosure, a sheet of Darice Mesh or plastic canvas (approximately 12"×18") may be utilized to cover the climate controlling components (see, e.g., FIG. 1—Item A). It could be a cooling wrap in that the exterior of the mesh or canvas may be soft and pliable. The material utilized for the mat portion of the climate controlling mechanism, whether for use in the seat/back portion of a car seat/stroller and/or in a blanket may include but is not limited to fabric, rubber, felt, suede (or suede-like material), cotton, and other breathable fabrics. It should be appreciated that a breathable fabric should be used to cover a rubber-like mat in some embodiments of the present disclosure so that air may pass through the fabric, thereby cooling or heating the child as needed, and in some embodiments (see, e.g., FIG. 4) the fabric may include one or more holes within the fabric. It should be appreciated that the size of the material may be larger or smaller depending on the size of the climate controlling mechanism being constructed. It also should be appreciated that plastic canvas wrap or another similar material may be utilized such that it may allow for cooling/heating as desired while also protecting the climate controlling components from external effects, such as weather, spills, or even just touching/opening by a child. In some embodiments of the present disclosure, this plastic canvas wrap or similar material may be covered with an additional layer. The actual wrap itself also may be wiped clean. In some embodiments of the present disclosure, woven cotton washable fabric may be employed either as an additional layer over the plastic canvas wrap or as a standalone covering for the cooling/heating components. It should be appreciated that this layer may be formed of cotton or another material that may be washable and it may be provided with multiple print and/or fabric options according to embodiments of the present disclosure. In other embodiments of the present disclosure, another type of fabric or material, such as felt, may be used to cover the bottom of the climate controlling mechanism. It also should be appreciated this material may be utilized to cover the bottom of the cooler that may be employed within the climate controlling mechanism without departing from the present disclosure.

As previously discussed, FIG. 2 depicts a climate controlling mechanism for a car seat/stroller according to another embodiment of the present disclosure. The climate controlling mechanism may include a sensor and circulation pad connected to a fan/compressor via one or more pieces of tubing that may deliver air and/or power to the sensor and circulation pad. It should be appreciated that the circulation pad may include one or more layers of fabric in some embodiments of the present disclosure. The fan/compressor also may be connected to a 12V adapter and/or USB, which may provide a power supply to the fan/compressor in some embodiments of the present disclosure. The fan/compressor also may be operated via a remote in some embodiments of the present disclosure, and it should be appreciated that such a remote may be hard-wired to the fan/compressor or it may be cordless/wireless without departing from the present disclosure. While not specifically depicted in FIG. 2, it should be appreciated that a climate controlling mechanism according to embodiments of the present disclosure also may include additional fabric pieces to cover the circulation pad and sensor, and there may be additional tubing/wiring in order to operate the climate controlling mechanism.

While the embodiments described herein have been primarily describing climate controlling mechanisms that may be cooling mechanisms, it should be appreciated that there may be embodiments wherein warm water or air may be run through the climate controlling mechanism to regulate the temperature. For example, if a car seat/stroller incorporating a climate controlling mechanism is to be utilized in a colder climate, then warm water/air may be added to arrive at the same temperature that may be reached when cooler water is added to the climate controlling mechanism in a warmer climate.

It should be appreciated that there may be embodiments of the present disclosure where the climate controlling mechanism may be utilized as a preventative measure so as to keep a child's body temperature regulated should a child be left in a car. In some embodiments of the present disclosure, the sensor may provide such detection, and there may be embodiments where the climate controlling mechanism is electronically configured so that even if the car has been turned off, the climate controlling mechanism may continue to cool or heat as needed. Accordingly, the child's body temperature may not rise so fast as to be dangerous when it is hot outside (as well as in the car) and similarly, the child's body temperature may remain regulated when it is cold outside (as well as in the car).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A climate controlling mechanism for use in a car seat or stroller, the climate controlling mechanism comprising:
    at least one circulation pad attached to at least one sensor having a plug-in, the at least one circulation pad connected to a fan and a compressor via a tubing arranged to deliver air and power to the at least one circulation pad and the at least one sensor at a continuous rate without inflating or deflating the at least one circulation pad;
    a temperature controller connected to the at least one circulation pad; and
    at least one input mechanism connected to the temperature controller to elect a temperature range to heat or cool the at least one circulation pad,
    wherein the plug-in removably attaches the at least one sensor to the at least one input mechanism,
    wherein the at least one circulation pad is placed in at least one of the following: a seat portion of the car seat or stroller, a back portion of the car seat or stroller, and a blanket,
    wherein the climate controlling mechanism provides even heating and cooling to the at least one circulation pad, and
    wherein the at least one sensor is configured to automatically sense and prevent a child from overheating and overcooling when left unattended in the car seat or stroller.

2. The climate controlling mechanism of claim 1 wherein the climate controlling mechanism is integrated with the car seat or stroller.

3. The climate controlling mechanism of claim 1 wherein the climate controlling mechanism is removable from the car seat or stroller.

4. The climate controlling mechanism of claim 1 further comprising:
    a charging mechanism.

5. The climate controlling mechanism of claim 1 wherein the climate controlling mechanism is self-charging.

6. The climate controlling mechanism of claim 1 further comprising:
    a powering mechanism that communicates with the temperature controller and the at least one input mechanism to operate the climate controlling mechanism.

7. The climate controlling mechanism of claim 1, the at least one input mechanism comprising:
    an auto-set mechanism to program the climate controlling mechanism to operate within a selected temperature range, the auto-set mechanism selected from the group comprising: a dial, a touch screen, and a keypad.

8. The climate controlling mechanism of claim 7 further comprising:
    a fail safe that stops heat and cooling the at least one circulation pad when it is outside the selected temperature range.

9. The climate controlling mechanism of claim 1 wherein the at least one sensor is removably attached to the temperature controller.

10. The climate controlling mechanism of claim 1 wherein the temperature controller comprises a pump and a water reservoir.

11. The climate controlling mechanism of claim 1 wherein the climate controlling mechanism is preset or programmed to operate at a predetermined temperature range.

12. The climate controlling mechanism of claim 11 wherein the tubing extends a first distance between a plastic device and a mat placed on a seat or back portion or a second distance between the plastic device and a blanket, wherein the plastic device is arranged to house the fan and the compressor.

13. The climate controlling mechanism of claim 1 further comprising:
    a remote control that communicates with the temperature controller.

14. The climate controlling mechanism of claim 1 wherein the at least one circulation pad is a rubber-like mat covered with a breathable fabric.

15. A climate controlling mechanism for use in a car seat or stroller, the climate controlling mechanism comprising:
    a first circulation pad attached to at least one sensor having a plug-in, the at least one circulation pad connected to a fan and a compressor via a tubing arranged to deliver air and power to the at least one circulation pad and the at least one sensor at a continuous rate without inflating or deflating the at least one circulation pad;
    a temperature controller connected to the first circulation pad, the temperature controller arranged to house the fan and the compressor and transfer the air to the first circulation pad to heat or cool the first circulation pad without inflating or deflating the at least one circulation pad; and
    at least one input mechanism connected to the temperature controller to elect a temperature range to heat or cool the first circulation pad,
    wherein the plug-in removably attaches the at least one sensor to the at least one input mechanism, wherein the first circulation pad is placed in a seat/back portion of the car seat or stroller, wherein the climate controlling mechanism provides even heating and cooling to the at least one circulation pad, and wherein the at least one sensor is configured to automatically sense and prevent a child from overheating and overcooling when left unattended in the car seat or stroller.

16. The climate controlling mechanism of claim 15 further comprising:

a second circulation pad connected to the temperature controller, wherein the second circulation pad is incorporated into a blanket and the temperature controller transfers air to the second circulation pad to heat or cool the second circulation pad.

17. The climate controlling mechanism of claim 15, the at least one input mechanism comprising:

an auto-set mechanism to program the climate controlling mechanism to operate within a selected temperature range, the auto-set mechanism selected from the group comprising: a dial, a touch screen, and a keypad.

18. The climate controlling mechanism of claim 15 wherein the climate controlling mechanism is selectively removable from the car seat or stroller.

19. The climate controlling mechanism of claim 15 the at least one input mechanism corresponding to fan speed levels.

20. A climate controlling mechanism for use in a car seat or stroller, the climate controlling mechanism comprising:

at least one circulation pad attached to at least one sensor having a plug-in, the at least one circulation pad connected to a fan and a compressor via a tubing arranged to deliver air and power to the at least one circulation pad and the at least one sensor at a continuous rate without inflating or deflating the at least one circulation pad;

a temperature controller connected to the at least one circulation pad;

at least one input mechanism connected to the temperature controller to elect a temperature range to heat or cool the at least one circulation pad; and a powering mechanism that communicates with the temperature controller and the at least one input mechanism to operate the climate controlling mechanism, wherein the plug-in removably attaches the at least one sensor to the powering mechanism, wherein the at least one circulation pad is placed in at least one of the following: a seat portion of the car seat or stroller, a back portion of the car seat or stroller, and a blanket, wherein the climate controlling mechanism provides even heating and cooling to the at least one circulation pad, and wherein the at least one sensor is configured to automatically sense and prevent a child from overheating and overcooling when left unattended in the car seat or stroller.

* * * * *